United States Patent Office 2,811,479
Patented Oct. 29, 1957

2,811,479

INSECTICIDAL BAIT COMPOSITION

Robert J. Geary, Blue Point, N. Y.

No Drawing. Application August 20, 1954,
Serial No. 451,298

9 Claims. (Cl. 167—48)

This invention relates to the production of a novel and improved insecticidal composition, and more particularly to the use in such a composition of molasses as the attractant.

Blackstrap molasses is a readily available and inexpensive product of the cane and beet sugar industries, and its use as an attractant for insects has long been known. However, its characteristic stickiness and extremely high viscosity pose handling, packaging, and dispensing problems which have always prevented its being more widely used, despite its relatively low cost. Its water content is an additional factor militating against its wider usage, since it would decompose and/or hydrolyze certain insecticides such as those of the organic phosphate type, for example tetraethyl pyrophosphate, the dimethyl, di-n-propyl, and di-isopropyl esters of phosphoric, pyrophosphoric, thiophosphoric and pyrothiophosphoric acids, and the like.

It is an object of the present invention to provide an insecticidal composition containing blackstrap molasses as an attractant. Another object of this invention is to enable the use of such molasses in an insecticidal particulate composition despite its originally objectionable properties of stickiness, high viscosity and water content. A still further object of this invention is to provide a modus operandi whereby such molasses may be employed with impunity in combination with a readily hydrolyzable insecticide. Other objects and advantages will appear as the description proceeds.

The attainment of the above objects is made possible by the instant invention, which is based upon the discovery that the objectionable properties of blackstrap molasses may be vitiated by mixing it with an amount of an anhydrous non-insect repellent water-binding agent at least sufficient to bind the water in the molasses as water of crystallization. Subsequent addition of an insecticide and, preferably, a free-flowing particulate dry inert carrier yields an improved insecticidal composition containing the desired combination of molasses as bait or attractant, and insecticide.

In the preferred mode of carrying the invention into effect, the molasses is first mixed with the required amount of anhydrous non-insect repellent water-binding agent, which amount will depend upon the water content (concentration) of the molasses and the water-binding capacity of the particles of said agent. Stated otherwise, for each mole of water in the molasses, there should be employed at least one mole of water-binding agent divided by the number of moles of water it is capable of binding as water of crystallization. As the water-binding or crystallization process proceeds, each particle or crystal of water-binding agent becomes coated with a hard, tacky film of dehydrated molasses which is successfully attacked by the saliva of the insects to be controlled.

At the end of the water-binding process or immediately prior thereto, when the molasses is still in a highly viscous and sticky state, the insecticide is added to the mixture in any desired amount. With some insecticides it is sometimes preferable to first heat the mixture containing the particles of water-binding agent coated with molasses in order to melt or soften the molasses film whereby the insecticide is dispersed in and/or on the said film. There is thus produced a particulate composition in which each particle of water-binding agent is coated with a film of dehydrated molasses containing an insecticide dispersed therein and/or thereon. This composition may be crumbled, hammer-milled, or otherwise worked to break up any agglomerates in the mass.

For many formulations, it is often desirable and may in fact be necessary, as where a high concentration of a normally liquid insecticide is contemplated, to add a free-flowing, particulate dry inert carrier. This carrier may be of 10 mesh or less to 100 mesh or more, depending on the insecticide, the insects for which it is intended, concentrations of other ingredients and the like, and may be added together with or after the insecticide.

In another mode of carrying out the instant invention, the molasses and insecticide are first mixed, aand the resulting composition admixed with the anhydrous water-binding agent, which agent may, if desired, contain a free-flowing particulate or finely divided dry inert carrier. This method is not preferred because some decomposition and hydrolysis of certain insecticides may take place during the initial mixing with the molasses. However, this method is ordinarily not objectionable since in most instances the insecticide is unaffected by moisture or, if sensitive to moisture, not affected to any substantial degree during the relatively brief period it is in contact with the molasses before admixture with the anhydrous water-binding agent. As in the preferred mode, the composition may be reduced to the desired physical condition by milling, rubbing, grinding or the like.

Depending upon the constitution, particularly the concentration of the particular batch of blackstrap molasses selected for use, the other components in the composition, and the desired use, the molasses may be employed in proportions of about 10 to 50% by weight of the composition. In general, the usual constitution of blackstrap or "third" molasses comprises about 50% sucrose, 30% non-sugars including mineral matter, and 20% water.

It will be understood that the particular manipulative mode of admixture of any of the ingredients of the compositions of this invention, selected for use in any instance, will be a matter of choice depending upon the ingredients, their physical condition and the like. Spraying, stirring, kneading, grinding or any other known expedient may be employed.

As the anhydrous water-binding agent to be employed in the instant invention, anhydrous calcium sulfate is preferred. However, other similar agents may also be employed, such as the anhydrous forms of calcium pyrophosphate, calcium pyrophosphite, calcium tartrate, magnesium phosphate, magnesium sulfate, manganese sulfate, barium sulfate, strontium sulfate and the like, and mixtures thereof. Said agent must obviously not have the property of repelling insects, since such property would greatly reduce or nullify the insecticidal effectiveness of the compositions of this invention. Ordinarily, these agents may be selected from a group consisting of the sulphates, phosphates, pyrophosphates, pyrophosphites and tartrates of calcium, magnesium, manganese, barium and strontium.

The instant invention is most advantageous when employed in the formulation of readily hydrolyzable insecticides such as the organic phosphates described above. However, these and other insecticides which may or may not be sensitive to water may be employed, such as diethyl dioctyl pyrophosphates, hexaethyl tetraphosphate, Parathion (o,o-diethyl-o,p-nitrophenyl thiophosphate), Malathion (o,o-dimethyl dithiophosphate of diethyl mercaptosuccinate), Aldrin (1,2,3,4,10,10-hexachloro-1,4,4a,5,8,8a-hexahydro-1,4-endo, exo-5,8-dimethanonaphthalene), Dieldrin (1,2,3,4,10,10-hexachloro-6,7-exoepoxy-1,4,4a,5,6,7,8,8a - octahydro - 1,4 - endo, exo - 5,8 - dimethanonaphthalene), cube or derris resins, pyrethins, DDT, DDD, methoxy DDT, chlordane, rotenone, lead arsenate, nicotine, benzene hexachloride, dodecyl thiocyanate, phenothiazine, sulfur, and the like, and mixture thereof. The insecticide may be present in any desired proportions in the compositions of this invention, as for example from about 0.5 to 50% or more by weight.

The free-flowing particulate dry inert carrier, when employed, may be organic or inorganic. As organic carriers, there may be mentioned sawdust, the flours derived from soybean, peach pit, apricot pit, tobacco, walnut shell, wheat, wood and the like. As inorganic carriers there may be mentioned oxides, such as those of silicon, namely tripolite and diatomite, and of calcium, namely calcium lime and magnesium lime, carbonates such as calcite and dolomite, pumice, and silicates such as mica, talc, pyrophyllite and clays, namely montmorillonite, saponite, nontronite, beidellite, kaolinite, nacrite, dickite, anauxite, attapulgite, sepiolite, and the like. The foregoing carriers may be employed alone or as mixtures thereof, and may represent any desired proportion of the compositions of this invention, for example from 0 to 90% by weight, preferably 5 to 50%. They may be employed in any desired particulate form, ranging from discrete granules to fine dusts.

The compositions of this invention are particularly effective against flies, but other insects of house or garden may be likewise controlled, such as aphids, thrips, milkweed bugs, mealy bugs, sow bugs, Southern army worms, beetles, ants, roaches, boll weevils, cutworms, grasshoppers, and the like.

The following example, in which parts are by weight unless otherwise indicated is illustrative of the instant invention and is not to be regarded as limitative:

*Example*

33 parts of blackstrap molasses is sprayed on 20 parts of anhydrous calcium sulfate, and the mass stirred to a homogeneous mixture. To this mixture, 1 part of Malathion is added, and then 46 parts of powdered attapulgite. The mass is then subjected to gentle milling to break up agglomerates, and a powder is obtained which attracts and is lethal to insects.

This invention has been described with respect to certain preferred embodiments, and various modifications and variations thereof will become obvious to the person skilled in the art. It is to be understood that such modifications and variations are to be included within the spirit and purview of this application and the scope of the appended claims.

What I claim is:

1. An insecticidal particulate composition comprising, approximately by weight, 10 to 50% of blackstrap molasses, an amount of a water-binding agent selected from the group consisting of the anhydrous sulfates, phosphates, pyrophosphates, pyrophosphites and tartrates of calcium, magnesium, manganese, barium and strontium at least sufficient to bind the water in said molasses, and 0.5 to 50% of an insecticide.

2. A composition as defined in claim 1 in which said water-binding agent is anhydrous calcium sulfate.

3. A composition as defined in claim 1 in which said insecticide is a readily hydrolyzable organic phosphate.

4. A composition as defined in claim 1 in which said insecticide is o,o-dimethyl dithiophosphate of diethyl mercaptosuccinate.

5. An insecticidal particulate composition comprising, approximately by weight, 10 to 50% of blackstrap molasses, an amount of a water-binding agent selected from the group consisting of the anhydrous sulfates, phosphates, pyrophosphates, pyrophosphites and tartrates of calcium, magnesium, manganese, barium and strontium at least sufficient to bind the water in said molasses, 0.5 to 50% of an insecticide, and 5 to 50% of a free-flowing particulate dry inert carrier.

6. A composition as defined in claim 5 in which said water-binding agent is anhydrous calcium sulfate.

7. A composition as defined in claim 5 in which said insecticide is a readily hydrolyzable organic phosphate.

8. A composition as defined in claim 5 in which said insecticide is o,o-dimethyl dithiophosphate of diethyl mercaptosuccinate.

9. An insecticidal particulate composition consisting of, by weight, about 33 parts of blackstrap molasses, 20 parts of anhydrous calcium sulfate, one part of o,o-dimethyl dithiophosphate of diethyl mercaptosuccinate, and 46 parts of powdered attapulgite.

References Cited in the file of this patent

UNITED STATES PATENTS

| | | |
|---|---|---|
| 1,630,506 | Wilkins | May 31, 1927 |
| 2,640,800 | Shatto | June 2, 1953 |